Nov. 10, 1959     C. FAHL     2,911,897

MECHANISM FOR SETTING PHOTOGRAPHIC EXPOSURE VALUES

Filed Oct. 11, 1955     2 Sheets-Sheet 1

United States Patent Office 2,911,897
Patented Nov. 10, 1959

2,911,897

MECHANISM FOR SETTING PHOTOGRAPHIC EXPOSURE VALUES

Christoph Fahl, Gottingen, Germany, assignor to Hans Deckel, Munchen-Solln, Germany, and Friedrich Wilhelm Deckel, Zug, Switzerland Application October 11, 1955, Serial No. 539,896

Claims priority, application Germany October 15, 1954

4 Claims. (Cl. 95—64)

The present invention relates to an arrangement for setting the exposure values of a photographic shutter.

An object of the invention is the provision of a generally improved and more satisfactory shutter setting arrangement.

Another object is the provision of a shutter having simplified and improved means for setting an exposure value representing a given relationship between shutter speed and diaphragm aperture.

Still another object is the provision of a shutter which may be set with great rapidity, even by an inexperienced person, and which may be set to different exposure values in continuous series of settings, that is, settings which differ from each other by infinitesimal increments, the settings not being limited to various predetermined steps or spaced values.

A further object of the invention is the provision of a photographic shutter having an adjustable diaphragm for varying the size of the exposure aperture, in combination with two separate diaphragm adjusting means each of which is effective independently of the other, at least through a reasonable range, one of the diaphragm aperture adjusting means being coupled to the speed setting member of the shutter, and the other being capable of adjustment through infinitesimal increments.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
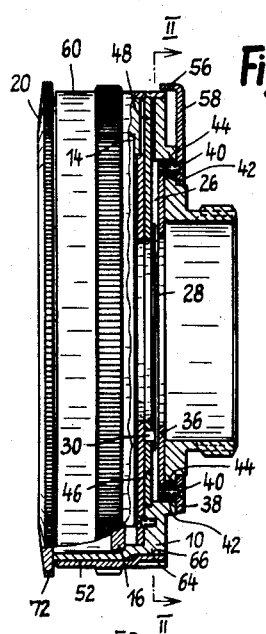
Fig. 1 is an edge view, partly in side elevation and partly in diametrical axial section, illustrating a shutter in accordance with a first embodiment of the present invention.
Figure 2:
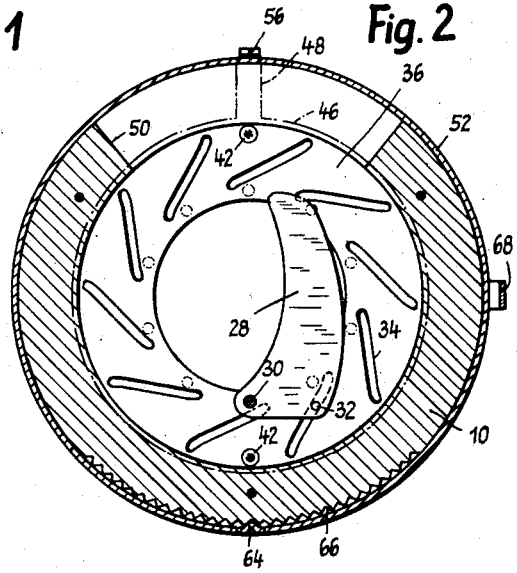
Fig. 2 is a transverse section taken substantially on the line 2—2 of Fig. 1.

Referring first to the embodiment of the invention shown in Figs. 1 to 4, the shutter here shown may be of any conventional construction already known, except for the differences mentioned below. The shutter comprises, for example, a casing indicated in general at 10, of the usual annular form having an exposure aperture extending axially through the center of the casing, which aperture is closed and opened at appropriate times by shutter blades 12 moved back and forth within the space 14 of the shutter and driven by conventional shutter blade driving mechanism mounted conveniently in front of the transverse plate 16 which extends across the shutter casing in the usual manner, this mounting plate having, of course, a central opening to allow passage of light through the shutter when the blades are in open position.

In the particular form of shutter here shown, the actuation of the shutter (that is, the cocking or tensioning of the shutter ready for exposure, and the release or triggering of the shutter to make an exposure) are both effected through the shaft 18 which extends out through the back wall of the shutter, parallel to the optical axis, and extends into the body of the camera with which the shutter is used, being there connected to suitable operating mechanism. Such shutters operated by such a shaft are already known, as disclosed for example in the copending United States patent application of Kurt Gebele, Serial No. 514,218, filed June 9, 1955 (issued on August 25, 1959, as Patent 2,900,885). However, it is immaterial for purposes of the present invention how the shutter mechanism is cocked or tensioned, and how it is released or triggered, and it need not be done through a shaft projecting out the back of the shutter casing, but may be done by any other suitable known mechanism, such for example as the older style but very familiar and widely used construction disclosed in United States Patent 1,687,123, granted October 9, 1928, on the application of Friedrich Deckel and Martin Geiger. If such a construction as shown in said Deckel patent is used, it will be understood, of course, that the various rings rotating on the shutter casing as herein disclosed are slotted circumferentially to permit the radial passage of the operating members such as the shutter tensioning arm 6 and the shutter trigger arm 101 of said Deckel patent.

A shutter speed setting ring 20 is mounted for rotation on the front of the shutter, and is held in place, for example, by a stationary front plate 21 of the shutter housing or casing, which overlaps part of the speed setting ring in the usual manner. The speed setting ring bears a graduated shutter speed scale 22 cooperating with a stationary pointer or reference mark 24 conveniently placed on the front plate 21.

Behind the shutter blades 12, and in cooperative relationship to the exposure aperture extending through the shutter, there is an adjustable iris diaphragm arranged in the annular space 26 and including a plurality of diaphragm blades or leaves 28, of any desired number. Ordinarily about ten such diaphragm leaves are used, only one of them being shown in Fig. 2 for the sake of clarity. Each leaf 28 is swingable about a pivot 30, and its control pin 32 engages in the control slit 34 of an annular diaphragm setting member or ring 36 which is rotatable in the rear part of the shutter casing. It will be understood, of course, that there is one slit 34 for each of the diaphragm leaves 28, these slits extending somewhat diagonally or obliquely to a radius drawn from the center of rotation of the ring, as plainly seen in Fig. 2. By turning the adjusting ring 36, all of the diaphragm leaves 28 are simultaneously swung in one direction or the other on their pivots 30 (so long as these pivots 30 remain at fixed points) thereby adjusting the size of the stop or diaphragm opening.

The actuation of the diaphragm setting ring 36 is effected by means of an external adjusting ring 38 rotatably supported on the rear wall of the shutter for rotation concentric with the internal ring 36 (about the optical axis of the shutter as a center of rotation) and operatively connected to the ring 36 by any suitable means such as two screws 40 passing axially through the ring 38 and screwed into bushings 42 secured to the internal ring 36, the shutter casing wall being provided with arcuate slots 44 through which the bushings extend, to allow for necessary rotary movement of the parts.

In addition to the rotatable setting rings 36, 38 of the iris diaphragm, the diaphragm has a second adjusting means, also of the ring type. For this purpose the pivot pins 30 of the diaphragm leaves 28, instead of being arranged in the customary manner at fixed or stationary points, engage with a rotatable ring 46 which, like the ring 36, rotates about the optical axis of the shutter as a center, and which has a radially extending arm 48 passing through a slot 50 in the casing. Thus the size of the aperture or stop in the diaphragm may be adjusted either by rotating the ring 36 while the ring 46 remains stationary, or by rotating the ring 46 while the ring 36 remains stationary. If both rings are turned simultaneously to the same extent, the diaphragm leaves as a whole are shifted bodily within the shutter casing, but no adjustment of the size of the aperture occurs.

In accordance with the invention, the additional diaphragm adjusting means is utilized for setting an exposure value which expresses a relationship between shutter speed and diaphragm aperture. For this purpose, the outer end of the radially projecting arm 48 of the diaphragm setting ring 46 is rigidly fastened (e.g., by riveting) to setting ring 52 which extends circumferentially around the outside of the shutter casing and which is rotatable thereon. This ring 52 is of generally cylindrical form, but preferably is provided, at an intermediate point between its front and rear edges, with a raised rib 53 extending peripherally or circumferentially, and having its outer face knurled or serrated for easy grasping and turning. On that part of the smooth periphery of the ring 52 which lies to the rear of the rib 53, the ring bears a diaphragm aperture scale 54, preferably graduated in the usual $f$ numbers, which scale cooperates with and is read in conjunction with a pointer or reference mark constituted by the bent over end 56 of a radially extending arm 58 formed on the actuating ring 38. In that part of the smooth periphery of the ring 52 which lies forwardly of the rib 53, there is a pointer or reference mark constituted by a small sight window or aperture 60, through which may be read one at a time the various graduations of an exposure value scale 62 marked on the periphery of the shutter casing 10 in position so that, as the ring 52 is turned, one or another of the graduations of the scale 62 becomes visible through the pointer window or reference window 60. The setting ring 52 is also provided with a resilient detent tongue 64 (see Fig. 2) which cooperates with notches or serrations 66 on the periphery of the shutter casing 10, to tend to hold the ring 52 frictionally in any particular position in which it is set. However, by exerting sufficient manual force on the serrated rib 53, the entire ring 52 may be turned, forcing the resilient detent 64 out of one of the notches 66 and into another notch.

Figure 3:
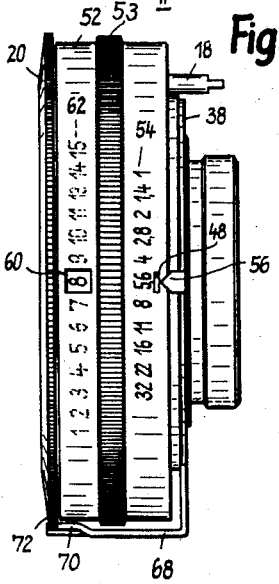
Fig. 3 is a top plan view of the shutter.
Figure 4:
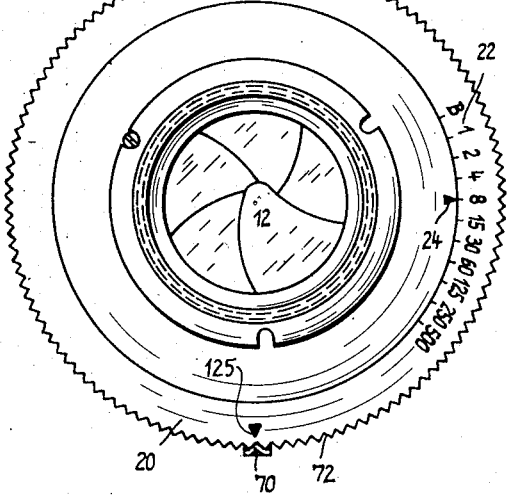
Fig. 4 is a front face view thereof.

In addition to the above mentioned radial arm 58, the diaphragm adjusting ring 38 also carries a second arm 68 which extends radially to a point past the edge of the ring 52, and thence extends forwardly parallel to the optical axis (as seen at the bottom of Fig. 3) to a resilient forward end 70 constituting an angular tooth for engaging in the notches or serrations 72 formed on the periphery of the shutter speed setting ring 20. The parts 68, 70, 72 constitute coupling means for coupling the diaphragm adjusting ring 38 to the shutter speed setting ring 20 so that when one ring is turned, the other will tend to turn with it. Just as in the case of the coupling 64, 66 between the ring 52 and the casing 10, this coupling 70, 72 can, when desired, be shifted to a different relative position of the parts, by forcing the resilient tongue 70 out of one of the notches 72 and seating it in another notch 72.

This embodiment of the invention operates as follows: The proper exposure value is determined, either by estimation on the basis of the experience of the operator, or by the use of a light meter or exposure meter. Let it be assumed that it is determined that the proper exposure value, under prevailing light conditions and in view of the film speed and the filter factor, if any, is "8."

The operator now grasps the serrated rib 53 of the ring 52 and turns the ring to bring the reference mark or window 60 opposite the numeral 8 of the exposure value scale 62, so that the exposure value 8 appears through the window as seen in Fig. 3. The resilient locking means 64, 66 will keep the ring 52 in this adjusted position when it has been adjusted.

This turning of the ring 52 causes corresponding turning of the arm 48 and ring 46, thereby adjusting the diaphragm aperture or stop to some particular size which, in combination with the particular shutter speed setting, represents an exposure value of 8. The size of the diaphragm aperture, in terms of $f$ number, may be determined by reading the aperture scale 54 in conjunction with the reference pointer 56.

When the shutter has been set to the desired exposure value by turning the ring 52 as aforesaid, there then exists a specific combination of exposure time and diaphragm aperture, available for taking the picture. In the particular example shown in Figs. 3 and 4, this combination consists of a shutter speed or exposure time of $\frac{1}{8}$ of a second (see Fig. 4) and a diaphragm aperture of $f$:5.6 (see Fig. 3). If this particular combination is not to the liking of the operator, he can select some other combination, for example an exposure time of $\frac{1}{2}$ second and a stop or diaphragm aperture of $f$:11, by grasping the peripheral edge of the speed setting ring 20 and turning it clockwise (when viewed from the front) through two graduations, so as to bring the $\frac{1}{2}$ second exposure time indication of the scale 22 opposite the reference mark 24. By means of the coupling parts 70, 72 this clockwise motion of the speed setting ring will cause corresponding clockwise motion of the diaphragm adjusting ring 38 to decrease the aperture of the diaphragm and to bring the pointer 56 opposite the graduation 11 of the aperture scale 54. This does not alter the position of the setting ring 52 which, together with its coupled ring 46, remains stationary. Similarly, any other desired combination of shutter speed and diaphragm aperture, within the limits of adjustment of the parts, may be selected by turning the ring 20 relative to the shutter casing, the ring 52 remaining stationary until it is desired to change it to set the mechanism for a different exposure value.

Figures 5, 6:
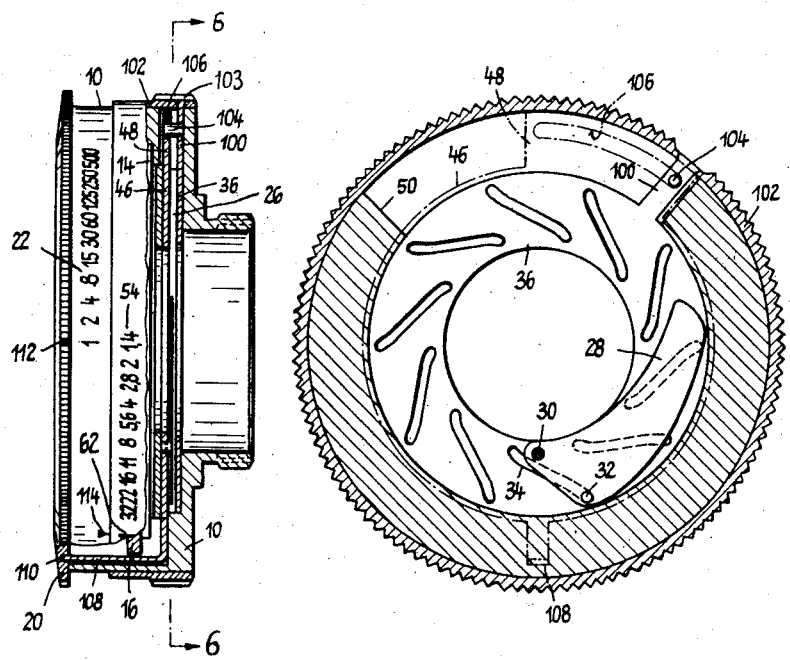
Fig. 5 is a view similar to Fig. 1 showing a second embodiment of the invention.
Fig. 6 is a view similar to Fig. 2, taken substantially on the line 6—6 of Fig. 5, and further illustrating this second embodiment of the invention.

Another embodiment of the invention will now be described in connection with Figs. 5-7 of the drawings. In most features, the second embodiment is the same as the first embodiment, and corresponding parts are designated by the same reference numerals used in Figs. 1-4, without repetition of description thereof.

As a difference from the first embodiment, the ring 38 is omitted, and the ring 36 is now provided with a radial arm 100 which extends outwardly through a circumferential slot 50 in the shutter casing 10 and is connected (e.g. by riveting) to an external setting ring 102 which rotates circumferentially on the periphery of the shutter casing or housing 10 and which is provided with a raised circumferential rib 103 with its outer edge knurled or serrated for easy grasping in order to turn the ring 102. The radial arm 48 of the second diaphragm adjusting ring 46 also moves in this same slot 50. Means is provided for coupling the ring 46 to the ring 36 so that both rings will turn together at certain times or under certain circumstances, but not at other times. In order to provide this coupling means, the radial arm 48 is extended a considerable distance in a circumferential direction, as seen in Fig. 6, and is provided with an arcuate slot 106 concentric with the optical axis of the shutter, which slot terminates at each end just short of the edge of the arm 48. A pin 104 on the arm 100 of the diaphragm adjusting ring 36 engages in this slot 106 and is freely movable circumferentially therein, until it comes to one end or the other of the slot. In this way, the two diaphragm adjusting rings 36 and 46 may be turned independently of each other to a considerable range determined by the length of the slot 106, but when this range is exceeded, the engagement of the pin 104 with the end of the slot 106 will cause the two rings thereafter to turn together.

In this second embodiment, the arm 48 on the ring 46 is no longer connected to an external ring like the ring 52 of the first embodiment, but the ring 46 is now coupled to the shutter speed setting ring 20 by means of a coupling tongue 108 on the ring 46 which extends first radially and then axially (see Fig. 5) and has a forward end engaging in a coupling notch 110 formed in the rear face of the speed setting ring 20.

Figure 7:
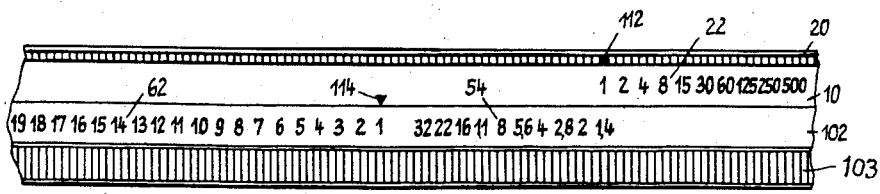
Fig. 7 is a developed view of the scales in this second embodiment of the invention.

In this second embodiment of the invention, the various graduated scales may be arranged as best seen in Fig. 7. The diaphragm setting ring 102, on a smooth part of its periphery lying in front of the rib 103, carries the diaphragm aperture scale 54 graduated in terms of f number, and also (circumferentially spaced from the scale 54) the exposure value scale 62. The shutter speed scale 22 is arranged on a smooth part of the periphery of the shutter casing or housing, forwardly of the ring 102. The shutter speed scale 22 and the diaphragm aperture scale 54 are both read in conjunction with a reference mark or pointer 112 placed on the peripheral edge of speed setting ring 20, while the exposure value scale 62 is read in conjunction with a reference mark or pointer 114 placed on the stationary casing 10.

This embodiment of the invention operates as follows: In the position shown in Figs. 5 and 7, the parts are set for an exposure speed of one second and a diaphragm aperture of f:1.4, which corresponds to an exposure value of 1. If the setting ring 102 is now moved to the right in Fig. 7, so as to set a new exposure value of "10" for example, the diaphragm aperture changes from its largest aperture f:1.4 to its smallest aperture f:32. The shutter speed setting remains unchanged, however, as the speed setting ring 20 does not move in this connection. When the setting ring 102 is turned as just described, the pin 104 moves with it, sliding freely in the slot 106, from the position shown in Fig. 6 to the opposite end of the slot 106.

If the operator now desires to have a still larger exposure value, as for example an exposure value of "19," then the setting ring 102 must be turned still farther to the right, to bring the numeral 19 of the scale 62 opposite the reference point 114. But the pin 104 is already at the end of the slot 106, so the further movement of the ring 102 and pin 104 (to the right when viewed as in Fig. 7, or counterclockwise when viewed as in Fig. 6) will carry the arm 48 and the second diaphragm setting means or ring 46 along with it, thus also carrying the shutter speed setting ring 20 with it, on account of the coupling connection formed by the parts 108, 110. Since both of the diaphragm adjusting rings travel together during this part of the movement, no further change in the size of the diaphragm aperture is effected, but the movement of the speed setting ring 20 carries the reference point 112 rightwardly relative to the shutter speed scale 22, to a position indicating a shutter speed of 1/500 of a second, while the diaphragm remains at f:32.

It is noted that in this construction, the setting of the exposure value can be effected in a continuous manner; that is, the adjustment may be varied by infinitesimal increments, not being dependent upon notches which would require an adjustment by predetermined steps. This represents a substantial advance over certain exposure value setting means heretofore suggested, wherein the change of setting from one exposure value to another had to be in steps or finite increments rather than permitting continuously variable adjustment. Within the limits of adjustment of the present mechanism, a considerable range of advantageous settings is possible.

In the preferred form here disclosed, it is seen that the diaphragm adjusting means and the shutter speed setting means are both combined in a single shutter structure. However, the same principles of the invention may be used when the adjustable diaphragm and its adjusting means, instead of being built into the shutter structure, is located in a separate structure such as an interchangeable lens mount with built in diaphragm.

In the second form of the invention, the connection or coupling 108 or 110 between the diaphragm adjusting ring 46 and the shutter speed setting ring 20, is preferably a fixed or constant connection, rather than an adjustable one. In the first form of the invention, the connection or coupling 70, 72 between the diaphragm adjusting ring 36, 38 and the shutter speed setting ring 20 is a resilient variable connection. However, in this first form of the invention the exposure value scale 62 will give correct indications only when the coupling tongue 70 is at a certain predetermined point on the periphery of the speed setting ring 20. At all other points of possible adjustment, the indications of the exposure value scale 62 will not be correct. Therefore, to show clearly and conspicuously the particular position on the ring 20 at which the coupling tongue 70 should be set, the face of the ring 20 is provided with a reference mark 125 (Fig. 4) to indicate what may be called the normal position or preferred coupling position of the tongue 70. The tongue 70 will normally remain set opposite this reference mark 125, so that the speed setting ring 20 and the diaphragm aperture adjusting ring 36, 38 will normally remain oriented in the same position relative to each other, moving together as a unit when the speed setting ring 20 is turned. Under special conditions, the resilient tongue 70 can be adjusted to some other position on the periphery of the ring 20, and can easily be brought back to the normal position opposite the reference mark 125, when the special condition is no longer required.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising a fixed casing part having an exposure aperture extending therethrough, a shutter speed setting member rotatable with respect to said casing part, an adjustable iris diaphragm for adjusting the effective exposure size of said exposure aperture and having a plurality of movable diaphragm leaves each having two pivots, a first ring engaging one set of pivots of the respective leaves, a second ring engaging the other set of pivots of the respective leaves, both of said rings being rotatably mounted with respect to said casing part and with respect to each other, the parts being so arranged that rotation of either ring while the other is held stationary will serve to adjust the aperture of said diaphragm, means for coupling one of said rings to said speed setting member to turn therewith, graduated scale means for indicating the relative adjusted position of the other of said rings with respect to said fixed casing part, and means for limiting the rotation of said two rings relative to each other, said limiting means serving to drive one ring by movement of the other when it is attempted to turn said rings beyond their limits of rotation relative to each other.

2. A photographic shutter comprising a substantially annular casing having an exposure aperture passing therethrough and having an optical axis extending centrally through said exposure aperture, adjustable diaphragm leaves movable to vary the effective size of said exposure aperture, a first diaphragm adjusting ring rotatable in said casing about said optical axis as a center of rotation, a second diaphragm adjusting ring also rotatable in said casing about said optical axis as a center of rotation, pin means operatively connecting each of said diaphragm leaves to both of said diaphragm adjusting rings so that rotation of either of said diaphragm adjusting rings while the other is stationary will serve to move said leaves to vary the effective size of said aperture, a shutter speed setting member carried by said casing and also rotatable about said optical axis as a center of rotation, said shutter speed setting member being spaced axially from both of said diaphragm adjusting rings, means including an arm extending in a general direction parallel to and offset from said optical axis for connecting said speed setting member to said first diaphragm adjusting ring to turn said first ring by turning movement of said speed setting member, to vary the effective size of the exposure aperture automatically by adjustment of said shutter speed setting member, a manually accessible part secured to said second diaphragm adjusting ring for manually turning said second ring to vary the effective size of the exposure aperture without changing the shutter speed, and a pin and slot connection between said first and second diaphragm adjusting rings to limit the extent to which one of them may turn relative to the other, so that when it is attempted to turn said second ring farther than allowed by said pin and slot connection, said second ring will carry said first ring with it, thereby to change the shutter speed.

3. A photographic shutter comprising a substantially annular casing having an exposure aperture passing therethrough and having an optical axis extending centrally through said exposure aperture, adjustable diaphragm leaves movable to vary the effective size of said exposure aperture, a first diaphragm adjusting ring rotatable in said casing about said optional axis as a center of rotation, a second diaphragm adjusting ring also rotatable in said casing about said optical axis as a center of rotation, pin means operatively connecting each of said diaphragm leaves to both of said diaphragm adjusting rings so that rotation of either of said diaphragm adjusting rings while the other is stationary will serve to move said leaves to vary the effective size of said aperture, both of said diaphragm adjusting rings being substantially enclosed within said casing and substantially inaccessible for direct manual grasping, a shutter speed setting member carried by said casing and also rotatable about said optical axis as a center of rotation, said speed setting member having a part extending circumferentially of said casing externally thereof in position for convenient manual grasping to turn said speed setting member, a coupling connection between said speed setting member and said first diaphragm adjusting ring to turn said first diaphragm adjusting ring by turning movement of said speed setting member, to vary the effective size of the exposure aperture automatically by adjustment of said speed setting member, a manually accessible part secured to said second diaphragm adjusting ring and extending circumferentially of said casing externally thereof in position for convenient manual grasping to turn said second diaphragm adjusting ring to vary the effective size of the exposure aperture without changing the shutter speed, and a pin and slot connection between said first and second diaphragm adjusting rings to limit the extent to which one of them may turn relative to the other, so that when the limit of relative rotation is reached, further turning of one ring will carry the other with it.

4. A photographic shutter comprising a substantially annular casing having an exposure aperture passing therethrough and having an optical axis extending centrally through said exposure aperture, adjustable diaphragm leaves movable to vary the effective size of said exposure aperture, a first diaphragm adjusting ring rotatable in said casing about said optical axis as a center of rotation, a second diaphragm adjusting ring also rotatable in said casing about said optical axis as a center of rotation, pin means operatively connecting each of said diaphragm leaves to both of said diaphragm adjusting rings so that rotation of either of said diaphragm adjusting rings while the other is stationary will serve to move said leaves to vary the effective size of said aperture, both of said diaphragm adjusting rings being substantially enclosed within said casing and substantially inaccessible for direct manual grasping, a shutter speed setting member carried by said casing and also rotatable about said optical axis as a center of rotation, said speed setting member having a part extending circumferentially of said casing externally thereof in position for convenient manual grasping to turn said speed setting member, a coupling connection between said speed setting member and said first diaphragm adjusting ring to turn said first diaphragm adjusting ring by turning movement of said speed setting member, to vary the effective size of the exposure aperture automatically by adjustment of said speed setting member, a manually accessible part secured to said second diaphragm adjusting ring and extending circumferentially of said casing externally thereof in position for convenient manual grasping to turn said second diaphragm adjusting ring to vary the effective size of the exposure aperture without changing the shutter speed, a graduated scale for indicating the exposure value represented by any given position of orientation of said second diaphragm adjusting ring with respect to said casing, and a pin and slot connection between said first and second diaphragm adjusting rings to limit the extent to which one of them may turn relative to the other, so that when the limit of relative rotation is reached, further turning of one ring will carry the other with it.

References Cited in the file of this patent

UNITED STATES PATENTS

| | | |
|---|---|---|
| 1,469,763 | Snyder et al. | Oct. 2, 1923 |
| 2,467,946 | Rossmann et al. | Apr. 19, 1949 |
| 2,580,324 | Schwarz | Dec. 25, 1951 |
| 2,596,328 | Dorsey | May 13, 1952 |

FOREIGN PATENTS

| | | |
|---|---|---|
| 303,088 | Germany | Jan. 18, 1918 |